(12) United States Patent
Chesla et al.

(10) Patent No.: US 9,647,938 B2
(45) Date of Patent: May 9, 2017

(54) TECHNIQUES FOR PROVIDING VALUE-ADDED SERVICES IN SDN-BASED NETWORKS

(71) Applicant: Radware, Ltd., Tel Aviv (IL)

(72) Inventors: Avi Chesla, Tel Aviv (IL); Ehud Doron, Moddi'in (IL)

(73) Assignee: Radware, Ltd., Tel Aviv (IL)

( * ) Notice: Subject to any disclaimer, the term of this patent is extended or adjusted under 35 U.S.C. 154(b) by 104 days.

(21) Appl. No.: 13/913,932

(22) Filed: Jun. 10, 2013

(65) Prior Publication Data

US 2013/0329734 A1 Dec. 12, 2013

Related U.S. Application Data

(60) Provisional application No. 61/658,134, filed on Jun. 11, 2012.

(51) Int. Cl.
*H04L 12/741* (2013.01)
*H04L 29/06* (2006.01)
(Continued)

(52) U.S. Cl.
CPC .............. *H04L 45/74* (2013.01); *H04L 41/12* (2013.01); *H04L 45/64* (2013.01);
(Continued)

(58) Field of Classification Search
CPC ......... H04L 45/00; H04L 45/54; H04L 45/74; H04L 45/7457; H04L 45/64; H04L 41/00;
(Continued)

(56) References Cited

U.S. PATENT DOCUMENTS 7,340,506 B2 * 3/2008 Arunachalam ............... 709/219
7,415,018 B2 * 8/2008 Jones .................. H04L 63/1458
370/392

(Continued)

OTHER PUBLICATIONS

Open Networking Foundation, "Software-Defined Networking: The new Norm for Networks", Apr. 13, 2012, One White paper, p. 1-12.*

(Continued)

*Primary Examiner* — Michael Thier
*Assistant Examiner* — Rownak Islam
(74) *Attorney, Agent, or Firm* — M&B IP Analysts, LLC

(57) ABSTRACT

A method for providing value added services (VAS) in a software defined network (SDN). The method comprises determining which value added services and their order should be assigned to an incoming traffic; determining for each of the one or more value added services their respective servers providing the value added services and assigning a unique diversion value to each server; instructing at least one peer network element to set a diversion field in each packet in the incoming traffic with a diversion value corresponding to a server providing a first value added service of the one or more value added services; and instructing each edge network element to set the diversion field of each packet output by the server to designate a destination node for the packet, wherein the destination node is any one of the destination server and a server providing a subsequent value added service.

29 Claims, 5 Drawing Sheets

(51) Int. Cl.
*H04L 29/08* (2006.01)
*H04L 12/715* (2013.01)
*H04L 12/24* (2006.01)
*H04L 12/701* (2013.01)

(52) U.S. Cl.
CPC ........ *H04L 63/1458* (2013.01); *H04L 67/327* (2013.01); *H04L 45/00* (2013.01); *H04L 63/0892* (2013.01)

(58) Field of Classification Search
CPC ....... H04L 41/12; H04L 67/00; H04L 45/745; H04L 63/08; H04L 67/34; H04L 69/22; H04L 63/1458; H04L 67/327; H04L 45/34
USPC ....... 370/392, 389, 235, 230, 231, 351, 349, 370/393
See application file for complete search history.

(56) References Cited

U.S. PATENT DOCUMENTS

| | | | | |
|---|---|---|---|---|
| 2002/0169858 A1* | 11/2002 | Bellinger | .............. | H04L 41/046 709/220 |
| 2008/0109331 A1* | 5/2008 | Stadelmann et al. | ........... | 705/34 |
| 2008/0192756 A1* | 8/2008 | Damola et al. | ............... | 370/400 |
| 2009/0138577 A1 | 5/2009 | Casado et al. | | |
| 2010/0046532 A1* | 2/2010 | Okita | .................. | H04L 43/0817 370/401 |
| 2013/0051399 A1 | 2/2013 | Zhang et al. | | |
| 2013/0070762 A1* | 3/2013 | Adams | .................... | H04L 49/70 370/389 |
| 2013/0124707 A1* | 5/2013 | Ananthapadmanabha | ........................... | H04L 49/3009 709/223 |
| 2013/0272305 A1* | 10/2013 | Lefebvre | ................. | H04L 47/24 370/392 |
| 2013/0318243 A1* | 11/2013 | Chinthalapati | ......... | H04L 45/52 709/226 |
| 2014/0247714 A1* | 9/2014 | Sonoda | ................. | H04L 45/308 370/230 |
| 2015/0023210 A1* | 1/2015 | Kis | ....................... | H04L 45/563 370/254 |

OTHER PUBLICATIONS

Han, et al., "HoneyMix: Toward SDN-based Intelligent Honeynet", 2009, Arizona State University, pp. 1-6.
Medhi, et al., "Revisiting Traffic Anomaly Detection Using Software Defined Networking", 2011, NUST School of Electrical Engineering, pp. 161-180.

* cited by examiner

| IPv4 Header Format | | | | | |
|---|---|---|---|---|---|
| Offsets | Octet | 0 | 1 | 2 | 3 |
| Octet | Bit | 0 1 2 3 4 5 6 7 | 8 9 10 11 12 13 14 15 | 16 17 18 19 20 21 22 23 | 24 25 26 27 28 29 30 31 |
| 0 | 0 | Version  IHL | DSCP 313  ECN | Total Length | |
| 4 | 32 | Identification | | Flags  Fragment Offset | |
| 8 | 64 | Time To Live 311  Protocol | | Header Checksum | |
| 12 | 96 | Source IP Address | | | |
| 16 | 128 | Destination IP Address | | | |
| 20 | 160 | Options (if IHL > 5) | | | |

| Fixed header format IP6V |||||||
|---|---|---|---|---|---|---|
| Offsets | Octet | 0 | | 1 | 2 | 3 |
| Octet | Bit | 0 1 2 3 4 5 6 7 | 8 9 10 11 | 12 13 14 15 16 17 18 19 20 21 22 23 | 24 25 26 27 28 29 30 31 | |
| 0 | 0 | Version | Traffic Class 322 | Flow Label 323 | | |
| 4 | 32 | Payload Length ||| Next Header | Hop Limit 321 |
| 8 | 64 | Source Address ||||| |
| 12 | 96 | ||||| |
| 16 | 128 | ||||| |
| 20 | 160 | ||||| |
| 24 | 192 | Destination Address ||||| |
| 28 | 224 | ||||| |
| 32 | 256 | ||||| |
| 36 | 288 | ||||| |

FIG. 3B

TECHNIQUES FOR PROVIDING VALUE-ADDED SERVICES IN SDN-BASED NETWORKS

CROSS REFERENCE TO RELATED APPLICATIONS

This application claims the benefit of U.S. provisional application No. 61/658,134 filed on Jun. 11, 2012, the contents of which are herein incorporated by reference.

TECHNICAL FIELD

This invention generally relates to techniques for diverting traffic in software defined networks, and particularly for techniques for diverting traffic for the purpose of providing security services, in such networks.

BACKGROUND

A software defined networking (SDN) is a relatively new type of networking architecture that provides centralized management of network elements rather than a distributed architecture utilized by conventional networks. That is, in a distributed architecture each network element makes a routing, switching, and similar, decisions based on the results of traffic processing and a distributed control mechanism. In contrast, in the SDN, a network element follows routing (or switching), decisions received from a central controller.

In detail, the operation of a network element can be logically divided into a "control path" and a "data path". In the control path, control protocols, e.g., for building in routing protocols, a spanning tree, and so on, are operable. In the data path, packets-processing operations are performed on a per-packet basis. Such operations include examining each incoming packet and making decisions based on the examination as to how to handle the input packet (e.g., packet forwarding, packet switching, bridging, load balancing, and so on). Furthermore, in a conventional network, network elements typically include both the control and data planes, whereas in a native SDN, the network elements include the data path, and the central controller implements the control path.

The SDN can be implemented in wide area networks (WANs), local area networks (LANs), the Internet, metropolitan area networks (MANs), ISP backbones, datacenters, inter-datacenter networks, and the like. Each network element in the SDN may be a router, a switch, a bridge, a load balancer, and so on, as well as any virtual instantiations thereof.

In one configuration of a SDN, the central controller communicates with the network elements using an OpenFlow protocol. Specifically, the OpenFlow protocol allows adding programmability to network elements for the purpose of packets-processing operations under the control of the central controller, thereby allowing the central controller to dynamically define the traffic handling decisions in the network element. To this end, traffic received by a network element that supports the OpenFlow protocol is processed and forwarded according to a set of rules defined by the central controller.

Traffic received by a network element that supports the OpenFlow is processed and routed according to a set of rules defined by the central controller based on the characteristic of the required network operation. Such a network element routes traffic according to, for example, a flow table and occasionally sends packets to the central controller. Each network element is programmed with a flow table and can be modified by the central controller as required. The operation of network elements and the definition of flow tables according to the OpenFlow protocol is further described in the Open Flow Switch Specification issued by the Open Networking Foundation.

While the OpenFlow protocol allows programmability of network elements in the SDN, such means does not define how this capability can be utilized to efficiently provide value added services including, but not limited to, security services to users of the SDN.

In many instances of traffic processing for the purpose of service insertion, traffic should be diverted, or steered, from its original path to be processed by a chain of servers (other than the destination server) and after such processing be relayed (or injected) back to the network to their original destination. However, conventional solutions for traffic steering have a few limitations including, for example, relatively complicated diversion operations, because traffic diversion relies on dedicated border gateway protocol (BGP) announcements issued by special devices in the network, and loop tendency, because the conventional solutions for traffic injection can cause infinite packet loops. Furthermore, such configuration is generally cumbersome and may result in non-optimized paths and inefficient utilization of computing resources in routers (e.g., CPU time of routers). In addition, diversion of traffic to a chain of servers which are remote from each other, i.e., spread across the network, is even more difficult to implement using existing traditional networks.

Other conventional solutions for redirecting traffic include proxy or transparent proxy servers or network devices. Such network devices add more complexity into the network as they need to be deployed in line, creating an additional point of failure in the network.

Therefore, it would be advantageous to provide a solution for simple and efficient traffic diversion in the SDN for at least providing value added services.

SUMMARY

Certain embodiments disclosed herein include a method for providing value added services (VAS) in a software defined network (SDN). The method comprises determining an incoming traffic addressed to a destination server that needs to be assigned with at least one value added service; determining one or more value added services and their order to be assigned to the incoming traffic, when the incoming traffic is to be assigned with the value added services; determining for each of the one or more value added services their respective servers providing the value added services and assigning a unique diversion value to each server; instructing at least one peer network element in the SDN-based network to set a diversion field in each packet in the incoming traffic with a diversion value corresponding to a server providing a first value added service of the one or more value added services; and instructing each edge network element to set the diversion field of each packet output by the server to designate a destination node for the packet, wherein the destination node is any one of the destination server and a server providing a subsequent value added service.

Certain embodiments disclosed herein include a system for providing value added services (VAS) in a software defined network (SDN). The comprises a processor; a network-interface module connected to a SDN-based network and configured to communicate and program network elements of the SDN-based network; a memory connected to the processor and configured to store a plurality of instructions that when executed by the processor configure the system to: determine an incoming traffic addressed to a destination server that needs to be assigned with at least one value added service; determine one or more value added services and their order to be assigned to the incoming traffic, when the incoming traffic is to be assigned with the value added services; determine for each of the one or more value added services their respective servers providing the value added services and assigning a unique diversion value to each server; instruct at least one peer network element in the SDN-based network to set a diversion field in each packet in the incoming traffic with a diversion value corresponding to a server providing a first value added service of the one or more value added services; and instruct each edge network element to set the diversion field of each packet output by the server to designate a destination node for the packet, wherein the destination node is any one of the destination server and a server providing a subsequent value added service.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

FIGS. 3A and 3B are diagrams of an IP packet header illustrating different possible embodiments for usage of a diversion field.

DETAILED DESCRIPTION

Figure 1:
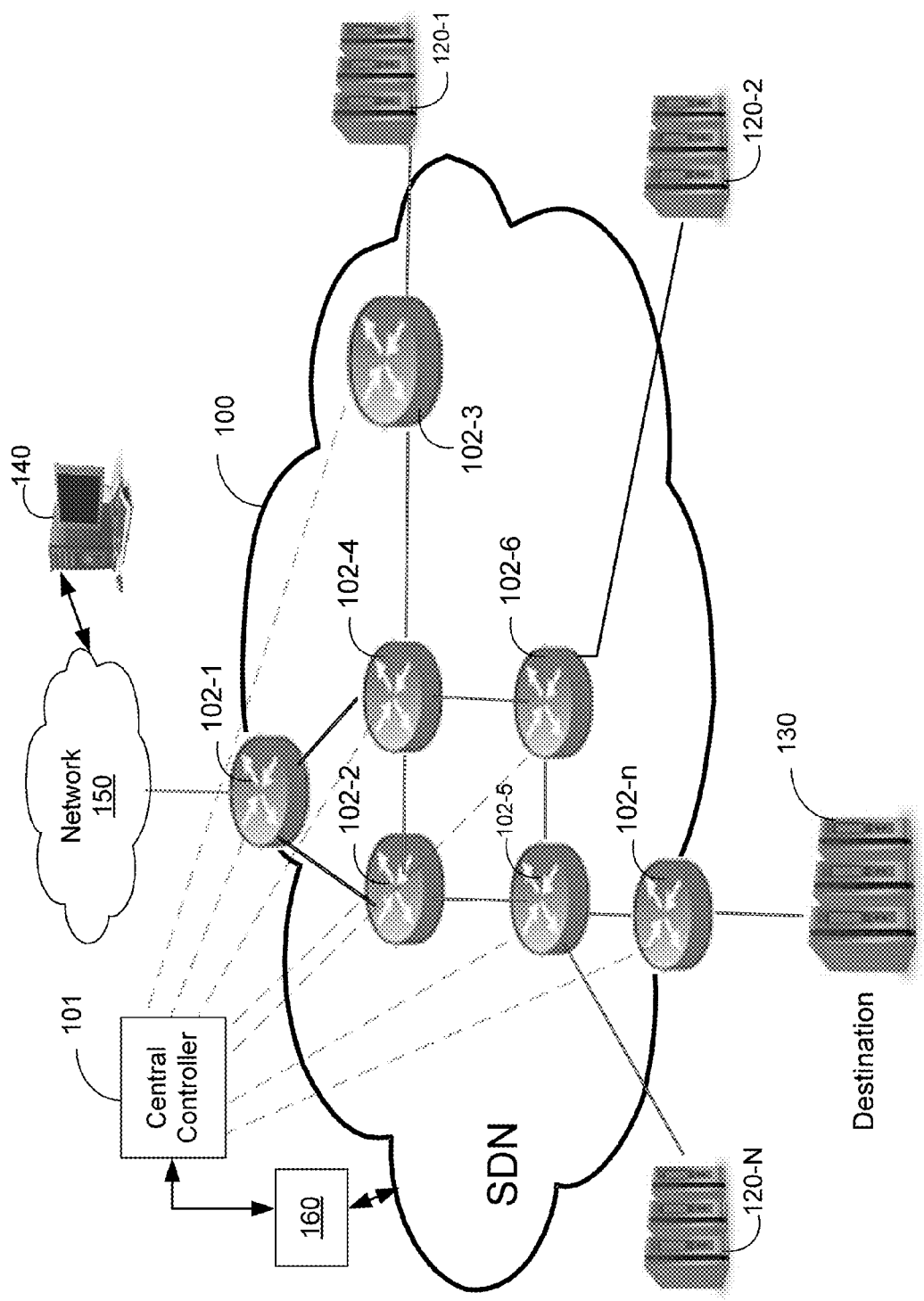
FIG. 1 illustrates a diagram of a SDN utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting diagram illustrating a topology of a SDN-based network (hereinafter SDN) 100 utilized to describe the various embodiments discussed herein. The SDN 100 includes a central controller 101 and a plurality of network elements 102-1 through 102-N. To the SDN 100 are further connected at least one destination server 130 and at least one client 140 that communicate with the destination server through a network 150 and the SDN 100. The destination server 130 may be operable in a cloud-system infrastructure, a hosting server, service provider networks or a cooperate network.

The network 150 which is external to the SDN may be, for example, a WAN, the Internet, an Internet service provider (ISP) backbone, and the like. The SDN 100 can be implemented in wide area networks (WANs), local area networks (LANs), service provider backbones, datacenters, inter-datacenter networks, a private cloud, a public cloud, an hybrid cloud, and the like. It should be noted that although one client and one destination server are depicted in FIG. 1 merely for the sake of simplicity, the embodiments disclosed herein can be applied to a plurality of clients, servers, and the like.

To the SDN 100 are further connected a plurality of servers 120-1 through 120-N. Each server 120 is designed to provide one or more value-added services to traffic that originated from client 140 and is addressed to the destination server 130. Each server 120 can provide one or more different services, including, but not limited to, acceleration services, off-loading services, authentication, authorization, and accounting (AAA) services, security services, and the like.

The security services include, for example, intrusion prevention, DoS/DDoS attacks mitigation, firewall, antivirus, anti-spam, URL filtering, web application firewall (WAF), etc. The acceleration services include, for example, WEB, caching, and protocol optimization, such as TCP optimization, HTTP optimization, HTML optimization, and so on. The off-loading services may include encryption and compression of data services, and the like.

In order to divert incoming traffic addressed to the destination server through one or more servers 120, the central controller 101 is configured to program the network elements 102 to perform this task. As will be discussed in greater detail below, designating the packets to be diverted does not change their destination address. Once the processing is completed by the one or more servers 120, the processed traffic is injected back into the network and is sent to the destination server 130.

Incoming traffic from the client 140 can travel through one of the servers 120-1, 120-N based on the services for which the owner of the destination server 130 paid. For example, the server 130 may be of a hosting company or a web-site that requires AAA and acceleration services. Thus, incoming traffic can be sent to the server 120-1 for authenticating the client 140 and then sent to perform HTTP optimization by a system in a server 120-2 that provides acceleration services. The central controller 101 programs the network elements to route the traffic between the servers 120 and to the destination server 130. The decision as to which chain of services to provide to incoming traffic can be based on the destination IP address of the incoming packet, the combination of source and destination IP addresses, or a combination of source and destination address and destination TCP or UDP port as designated in the incoming packets.

According to certain configurations, an external system 160 is connected to the central controller 101. The system 160 provides the controller 101 with information about, for example, the services chaining requested by the users. The system 160 can be connected to, for example, a billing server, a customer management (CRM) system, an audit system, and the like.

The designation of packets to be diverted to the chain of servers is performed by network elements 102 under the instruction of the central controller 101. In one embodiment, the central controller 101 is configured to instruct the peer and edge network elements to designate and clear the designation of all packets having the same network parameter. The network parameter may be, for example, a source IP address, a destination IP address, a destination port, or any combination thereof.

A peer network element is a network element of the SDN that the incoming traffic entered to the SDN flows through. For example, an element 102-1 is a peer network element. An edge network element is a network element directly connected to a server 120, i.e., all traffic from and to a server flows through the edge network element. In the exemplary FIG. 1, elements 102-3, 102-5, and 102-6 are edge network elements.

According to one embodiment, the designation includes setting a "diversion field" in a header of the packet to a predefined value. The diversion field may be a pre-defined field in the IP (Layer-3) header or an Ethernet/MAC (Layer-2) header. Different embodiments for designating the packets are disclosed herein below. The central controller 101 can modify the flow tables at the network elements 102, or can make any other supported programming operations, such that each element 102 would forward an incoming packet based on the value in the diversion field.

The central controller 101 is configured to enable the diversion of traffic through one or more servers 120, in a predefined order, based on the services that the traffic should receive. With this aim, the controller 101 programs the peer and edge network elements to set the diversion file to indicate a destination VAS server. Once all processing is completed, the diversion field value is cleared and the traffic is directed to the destination server 130.

As a non-limiting example, to provide the AAA and acceleration services, the controller 101 programs the peer network 102-1 to set the diversion field to a first value which indicates to elements 102 that traffic should be sent to a server 120-1 (which provides authentication services). The controller 101 also programs the edge element 120-3 to set the diversion field of packets output by the server 120-1 to a second value which indicates to elements 102 in the SDN 100 to forward the packets to the server 120-2 for acceleration processing. The controller 101 also programs the edge network element 102-6 to clear the diversion field of packets output by the server 120-2 in order to allow packets to be forwarded to the destination server 130, based on destination IP. It should be noted that the flow tables of all network elements 102 in the SDN 100 are programmed by the controller 101 to allow redirection of the traffic based on the diversion field's value. Therefore, the embodiments disclosed herein enable diversion of VAS provisioned traffic on-the-fly without prior provisioning of the network elements by a network administrator.

It should be noted that the SDN 120 can be provisioned with more than one VAS server that provide the same services operation. In such a configuration, the central controller can instruct all network elements to which of the VAS servers (of the same type) to divert the traffic on a per destination server 130 basis. Therefore, this would enable to provide diversion capabilities with high availability and scalability of VAS services.

According to one embodiment, the central controller 101 communicates with the network elements 102 of the SDN 100 using the OpenFlow protocol, discussed above, through a secure channel established with each network element 102.

Figure 2:
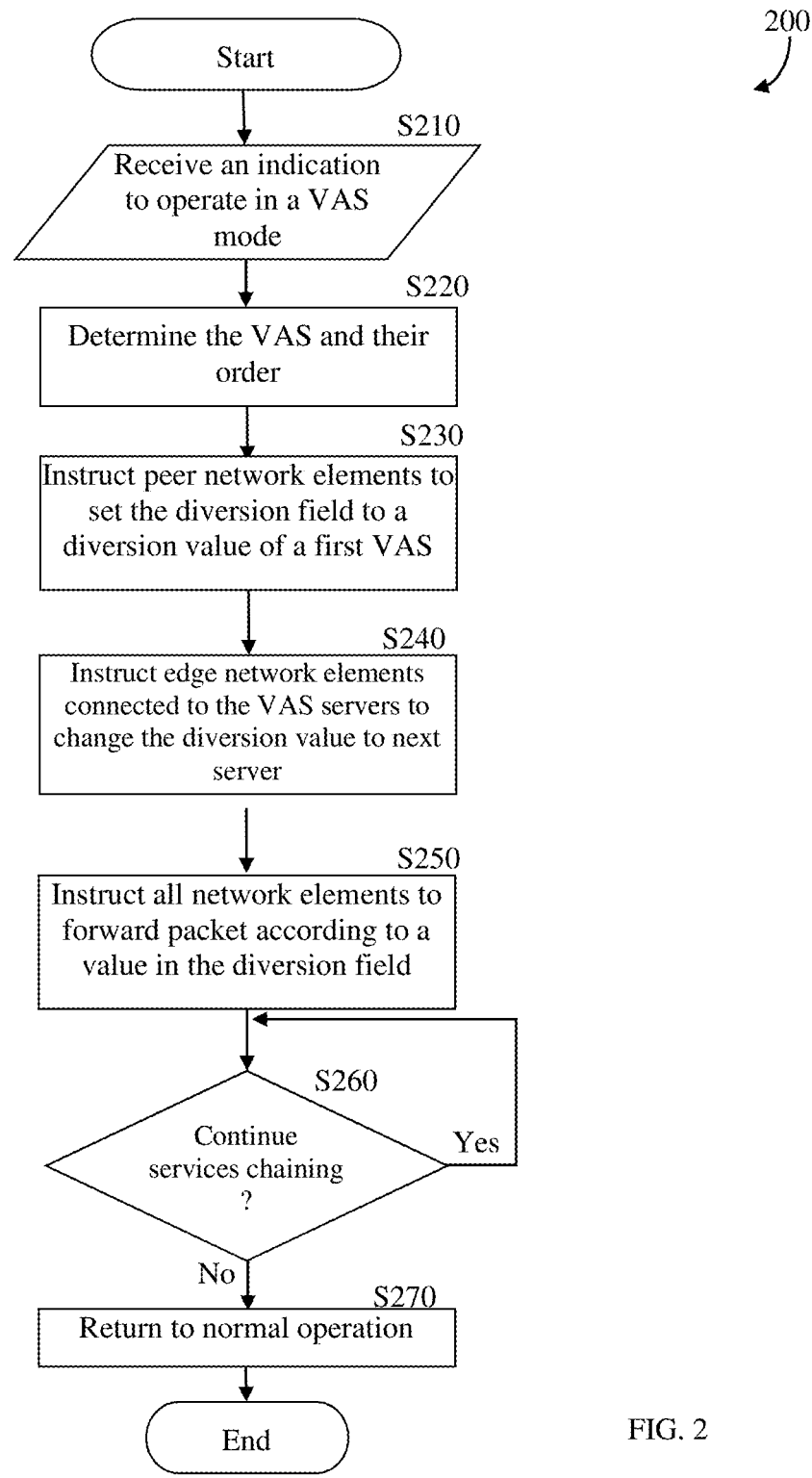
FIG. 2 is a flowchart illustrating a method for diverting traffic for providing value-added services according to one embodiment.

FIG. 2 shows a non-limiting and exemplary flowchart 200 for diverting traffic to a chain of value-added services (VAS) servers according to one embodiment. A VAS server, e.g., a server 120-1 provides value-added services to the clients according to provisions set by the service provider. As noted above, the services may include, but are not limited to, security services application services, acceleration services, off-loading services, and so on. The services can be provided on-demand as part, for example, of a cloud networking environment.

At S210, an indication is received that a VAS mode of operation should be applied. That is, services chaining should be performed on traffic addressed to a destination server (e.g., server 130) for the purpose of providing VAS.

In one embodiment, the indication is received from an external device, such as 160, as to whether traffic received from a client should be directed to one or more VAS servers in a predefined order. Such an external device may be, for example, a billing system, a CRM system, an audit system, a security management system, and the like. In another embodiment, the central controller 101 is configured with information about which packets should be diverted to the VAS servers. Such configurations can be performed by the service provider(s) and related to service-level agreements (SLAs) or service orders by customers.

At S220, the central controller determines which value added services have been assigned to the client based on pre-configured information maintained by the controller. The result of S220 is a list of services required to be provisioned to the client, the order in which to provide the provisioned services, and the unique diversion value of each server. The VAS is provisioned based on a destination IP address, and in certain cases, also based on the source IP address, because a specific customer (a source IP address) paid for specific set of services. Alternatively, the VAS may be provisioned based on both source (i.e., customer identification) and destination (i.e., type of service) IP addresses or ports. The unique diversion value of each service is set in a diversion field (e.g., one of the IP packet's header fields listed above) and indicates to which VAS database the traffic from the client should be forwarded.

At S230, a peer network element (e.g., element 102-1 of FIG. 1) is instructed, by the central controller, to set the diversion field in the incoming packet addressed to the destination server with a diversion value of the server that should provide the first service.

At S240, edge network elements connected to the VAS servers are instructed to change the diversion value in the diversion field of packets output by the VAS server to the value designating the server that should provide the next service. If an edge network element is connected to a VAS server that provides the last service on the list, then this network element is instructed to clear the value of the diversion field, so that packets will be forwarded to the destination server (e.g., server 130). That is, at S240, the edge network elements connected to the VAS servers are instructed to modify the value of the diversion field such that the new value will designate the next node (destination server or VAS server) to which the packets should be forwarded.

At S250, all network elements are instructed to forward all packets to the VAS server or destination server according to their respective diversion field's value. In one embodiment, this can be achieved by configuring the flow tables of each relevant network element of the SDN 100.

Various exemplary and non-limiting embodiments are disclosed herein for realizing the diversion field and its corresponding value. In one embodiment, the diversion field is an existing field in an IP or MAC packet's header, such as a header 310 and 320, shown in FIGS. 3A and 3B respectively, utilized to designate that a diversion is needed.

In one embodiment, various fields in an IPv4 packet header, such as the header 310 can utilized as the diversion field, for example, a TTL field 311, a DSCP (also known as TOS or ECN) field 313, or any combination thereof. It should be noted that the different options can be utilized to divert the traffic to different VAS destinations.

In another embodiment, various fields in an IPv6 packet header can be used to designate that a diversion is required. In one embodiment, such fields include a hop limit field 321, a traffic class field 322, a flow label field 323, an IPv6 extension header where a destination option header is used to designate the diversion, or a combination thereof.

In yet another embodiment, a source MAC address field in an Ethernet (Layer-2) header is utilized as the diversion field. The source MAC address is set to a pre-defined unique value that can be used as an indication to divert to a specific VAS server without any intervention and interruption to network operation. Because the source MAC address is a unique number, it cannot be used by any other Ethernet network interfaces of the devices in the SDN 100, thereby setting the source MAC address field of the incoming packet, from an edge or peer network elements, to a unique predefined value that can be used as an indication as to the traffic diversion requirement.

In an embodiment, a set of such unique MAC addresses is defined to support diversion to multiple VAS servers. In the layer-2 SDN-based networks the MAC learning is typically performed by the central controller and not by each network element, thus the MAC learning operation in the network is not disturbed when the source MAC address is changed and used as a diversion value. In layer-3 SDN-based networks, no MAC learning is performed based on a source MAC address. However, each router is programmed by the central controller not to update the source MAC address field, when such field contains a per-defined unique value.

In one non-limiting embodiment, the diversion value of the diversion field is set to a value respective of the type of field being utilized in such a way that a network element 102 recognizes such value as not being a value conventionally used or defined by the IP protocol forwarding or Layer-2 switching. For example, for each packet addressed to a destination IP address of the destination server 130, the TTL field (311) or Hop limit field (321) is assigned to a value of higher than 128 (e.g., 255) when traffic diversion is required to a specific VAS. Other ranges of the TLL or Hop limit fields can designate diversion to a different VAS server. This allows signing the packets while maintaining these fields' conventional functionality of infinite packet loop prevention.

Returning to FIG. 2, at S260, a check is made to determine if services chaining in the SDN should continue; and if so, execution waits at S260; otherwise, at S270 the central controller is configured to program the peer network element of the SDN and edge network elements not to set the diversion field to its diversion value. The central controller 101 may further instruct all the network elements 102 to forward packets according to their normal routing configuration, e.g., to implement a pre-defined interior IP routing operation and/or layer-2 switching operation.

The central controller can report to the external system the progress of providing the services and/or upon completion of such services. This would allow the external system to manage and charge for services provided to the client (e.g., client 140).

It should be noted that the method disclosed hereinabove provides a simple mechanism to divert traffic to VAS servers and inject processed traffic back to the network. The disclosed method solves at least the complexity associated with the conventional solutions for diverting and injecting traffic in the network.

Figure 4:
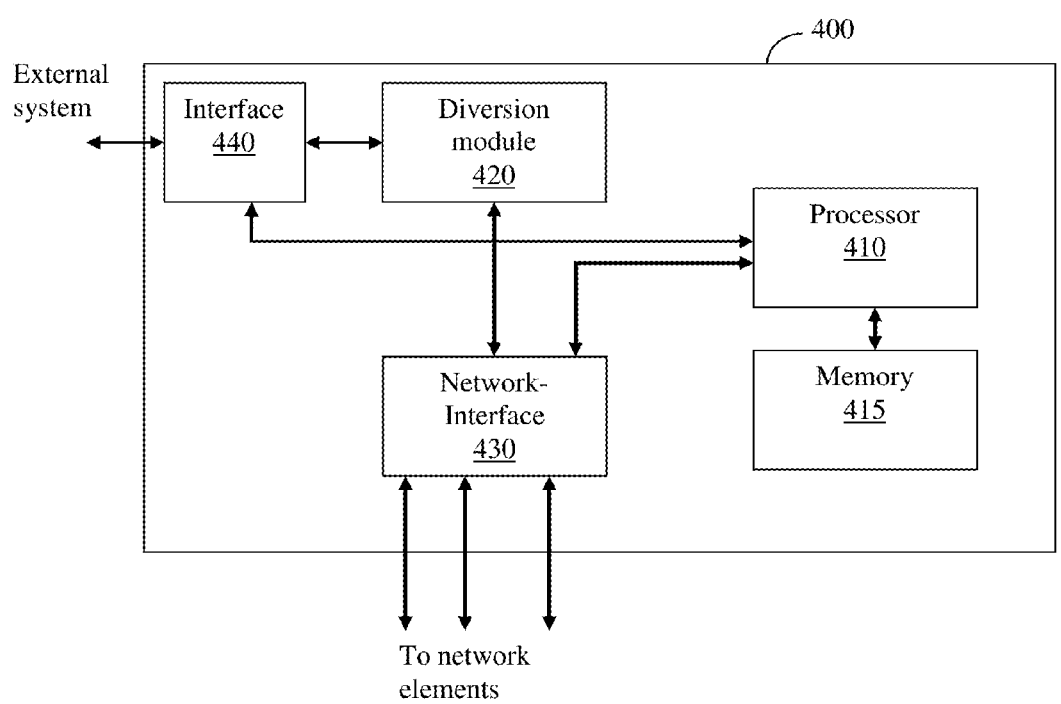
FIG. 4 is a block diagram of a central controller constructed according to one embodiment.

FIG. 4 shows an exemplary and non-limiting block diagram of the central controller 400 constructed according to one embodiment. The central controller 400 is operable in SDNs and is at least configured to execute the diversion methods described in greater detail above. The central controller 400 includes a processor 410 coupled to a memory 415, a diversion module 420, a network-interface module 430, and an interface 440 to an external system.

The network-interface module 430 allows the communication with the network elements of the SDN. In one embodiment, such communication uses the OpenFlow protocol discussed above through a secure channel established with each network element. In another embodiment, the communication is achieved through another control channel.

The interface 440 provides an interface to an external system, such as, but not limited to, a billing system, an attack detection device, a CRM system, an audit system, a security management system, and the like.

The diversion module 420 is configured to allow traffic diversion in the SDN. Specifically, the diversion module 420 determines the diversion values to be set in the diversion fields and instructs the network elements as to how to set the diversion values and how to forward the packets based on the diversion values. The division module 420 determines the diversion values based on the services that should be assigned to the client. The module 420 communicates with the network elements through the network-interface 430. The processor 410 uses instructions stored in the memory 415 to execute tasks generally performed by the central controllers of SDN as well as to control and enable the operation of the diversion module 420, a network-interface module 430, and an interface 440.

It should be noted that the teachings disclosed herein are also applicable to hybrid networks in which a SDN is a sub-network of a conventional network in which its elements cannot be programmed by a central controller. To allow the proper operation of the methods disclosed above in the hybrid network, network elements in the diversion path (i.e., from the peer or edge network element to the server) should be adapted to allow programmability by the central controller adapted to operate in a SDN-based network (e.g., central controller 101).

The foregoing detailed description has set forth a few of the many forms that the invention can take. It is intended that the foregoing detailed description be understood as an illustration of selected forms that the invention can take and not as a limitation to the definition of the invention.

Most preferably, the various embodiments of the invention can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for providing value added services (VAS) in a software defined network (SDN) the method is performed by a central controller of the SDN, comprising:
   determining, by the central controller, an incoming traffic addressed to a destination server that needs to be assigned with at least one value added service;
   determining, by the central controller, one or more value added services and their order to be assigned to the incoming traffic, when the incoming traffic is to be assigned with the value added services;
   determining, by the central controller, for each of the one or more value added services their respective intermediate servers providing the value added services and assigning a unique diversion value to each intermediate server;
   instructing, by the central controller, at least one peer network element in the SDN-based network to set a diversion field in each packet in the incoming traffic with a diversion value corresponding to an intermediate server providing a first value added service of the one or more value added services, wherein the diversion field is at least one field in a header of a communication protocol;
   instructing, by the central controller, each edge network element to set the diversion field of each packet output by the intermediate server to designate a destination node for the packet, wherein the destination node is any one of the destination server and an intermediate server providing a subsequent value added service.

2. The method of claim 1, further comprising:
   programming each network element in the SDN to forward the packet based on the diversion value designated in the diversion field.

3. The method of claim 1, wherein packets are sent to the destination server upon completion of the processing of all value added services assigned to the incoming traffic.

4. The method of claim 1, wherein the communication protocol is any one of: an internet protocol (IP) and a MAC protocol.

5. The method of claim 4, wherein the at least one field in the IP header is at least one of: a time to live (TTL) field, a hop limit field, a traffic class field, and an IP extension header, wherein the at least one field in the IP header depends on an IP version in the network.

6. The method of claim 4, further comprising:
   setting the diversion field to a value not conventionally used or defined by the IP protocol for the respective at least one field.

7. The method of claim 4, wherein the at least one field in the MAC header is a source MAC address field being set to an address not used by any network element.

8. The method of claim 4, wherein the designation of packets that are required for diversion is performed per source IP, per destination IP address, and per a layer-4 protocol type.

9. The method of claim 1, wherein the determination if the one or more value added services should be assigned to the incoming traffic is based in part on an indication from an external system, wherein the external system is any one of a billing system, a CRM system, an audit system, and a security management system.

10. The method of claim 1, wherein the determination of the one or more value added services and their order to be assigned to the incoming traffic is based on at least one of a destination IP address and a source IP address designated in the incoming traffic.

11. The method of claim 10, wherein the more value added services and their order to be assigned are provisioned by a service provider.

12. The method of claim 1, wherein the more value added services include at least one of acceleration services, offloading services, authentication, authorization, and accounting (AAA) services, and security services.

13. The method of claim 1, wherein the at least one peer network element is a network element of the SDN-based network, through which the incoming traffic addressed to the at least one destination server flows, and wherein each of the edge network elements is directly connected to an intermediate server providing the value added services.

14. The method of claim 1, wherein an OpenFlow protocol is utilized for communication with the network elements.

15. A non-transitory computer readable medium having stored thereon instructions for causing one or more processing units to execute the computerized method according to claim 1.

16. A system for providing value added services (VAS) in a software defined network (SDN), the system is configured to operate as a central controller of the SDN, comprising:
   at least one processor;
   a network-interface module connected to a SDN-based network and configured to communicate and program network elements of the SDN-based network;
   a memory connected to the processor and configured to store a plurality of instructions that when executed by the at least one processor configure the system to:
      determine an incoming traffic addressed to a destination server that needs to be assigned with at least one value added service;
      determine one or more value added services and their order to be assigned to the incoming traffic, when the incoming traffic is to be assigned with the value added services;
      determine for each of the one or more value added services their respective intermediate servers providing the value added services and assign a unique diversion value to each intermediate server;
      instruct at least one peer network element in the SDN-based network to set a diversion field in each packet in the incoming traffic with a diversion value corresponding to an intermediate server providing a first value added service of the one or more value added services, wherein the diversion field is at least one field in a header of a communication protocol; and
      instruct each edge network element to set the diversion field of each packet output by the intermediate server to designate a destination node for the packet, wherein the destination node is any one of the destination server and a server providing a subsequent value added service.

17. The system of claim 16, the system is further configured to:
   program each network element in the SDN to forward the packet based on the diversion value designated in the diversion field.

18. The system of claim 16, wherein packets are sent to the destination server upon completion of the processing of all value added services assigned to the incoming traffic.

19. The system of claim 16, wherein the communication protocol is any one of: an internet protocol (IP) and a MAC protocol.

20. The system of claim 19, wherein the at least one field in the IP header is at least one of: a time to live (TTL) field, a hop limit field, a traffic class field, and an IP extension header, wherein the at least one field in the IP header depends on an IP version in the network.

21. The system of claim 19, wherein the system is further configured to:
set the diversion field to a value not conventionally used or defined by the IP protocol for the respective at least one field.

22. The system of claim 19, wherein the at least one diversion field in the MAC header is a source MAC address field being set to an address not used by any network element.

23. The system of claim 18, wherein the designation of packets that are required for diversion is performed per at least one of: a source IP address, destination IP address, and a layer-4 protocol type.

24. The system of claim 18, wherein the determination if the one or more value added services should be assigned to the incoming traffic is based in part on an indication from an external system, wherein the external system is any one of a billing system, a CRM system, an audit system, and a security management system.

25. The system of claim 18, wherein the determination of the one or more value added services and their order to be assigned to the incoming traffic is based on at least one of: a destination IP address and a source IP address designated in the incoming traffic.

26. The system of claim 24, wherein the one or more value added services and their order to be assigned are provisioned by a service provider.

27. The system of claim 16, wherein the more value added services include at least one of acceleration services, off-loading services, authentication, authorization, and accounting (AAA) services, and security services.

28. The system of claim 16, wherein the at least one peer network element is a network element of the SDN-based network, through which the incoming traffic addressed to the at least one destination server flows, and wherein each of the edge network elements is directly connected to an intermediate server providing the value added services.

29. The system of claim 16, wherein an OpenFlow protocol is utilized for communication with the network elements.

* * * * *